United States Patent
Kahn et al.

(10) Patent No.: US 8,195,122 B1
(45) Date of Patent: Jun. 5, 2012

(54) METHOD AND APPARATUS FOR ADJUSTING THE FREQUENCY OF TESTING FOR A WIRELESS COMMUNICATIONS SIGNAL

(75) Inventors: Philippe Kahn, Aptos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 555 days.

(21) Appl. No.: 11/957,316

(22) Filed: Dec. 14, 2007

(51) Int. Cl.
*H04M 11/04* (2006.01)

(52) U.S. Cl. ..................................... 455/404.2

(58) Field of Classification Search .............. 455/504, 455/456.1, 414, 436, 441, 509, 423, 440, 455/457, 414.2, 404.2
See application file for complete search history.

(56) References Cited

U.S. PATENT DOCUMENTS

| | | | |
|---|---|---|---|
| 7,489,937 B2 * | 2/2009 | Chung et al. | 455/456.1 |
| 2002/0193124 A1 * | 12/2002 | Hamilton et al. | 455/456 |
| 2004/0106421 A1 * | 6/2004 | Tomiyoshi et al. | 455/509 |
| 2005/0210300 A1 | 9/2005 | Song et al. | |
| 2006/0205406 A1 * | 9/2006 | Pekonen et al. | 455/436 |
| 2007/0037610 A1 | 2/2007 | Logan | |
| 2007/0195784 A1 | 8/2007 | Allen et al. | |
| 2007/0213085 A1 * | 9/2007 | Fedora | 455/504 |
| 2008/0161072 A1 * | 7/2008 | Lide et al. | 455/574 |
| 2009/0098880 A1 * | 4/2009 | Lindquist | 455/456.1 |

* cited by examiner

*Primary Examiner* — Tu X Nguyen
(74) *Attorney, Agent, or Firm* — Blakely, Sokoloff, Taylor & Zafman LLP; Judith A. Szepesi (57) ABSTRACT

A method and apparatus for adjusting the frequency of testing for a wireless communications signal are described. The computer-implemented method comprises detecting a change in a wireless communications signal and adjusting a frequency of testing for the wireless communications signal. The method further comprises receiving motion data and determining, based on the motion data whether and whether to adjust the frequency of testing for the wireless communications signal.

22 Claims, 5 Drawing Sheets

METHOD AND APPARATUS FOR ADJUSTING THE FREQUENCY OF TESTING FOR A WIRELESS COMMUNICATIONS SIGNAL

FIELD OF THE INVENTION

The present invention relates to the field of network communications, and more specifically, a system for adjusting the frequency of testing for a wireless communications signal.

BACKGROUND

When a mobile device, for example, a cellular phone, is out of range of its network signal, it has little or no reception. The problem users face is that typically, when a cell phone is in a "no service" area, it drains its battery power. The consumption of battery power is usually attributed to the cell phone actively searching for a System Identification Code (SID) on a control channel, a special frequency that the cell phone uses to communicate with its service provider. The cell phone frequently and continually checks for a communications signal until it is within range of a coverage area and in doing so the cell phone significantly drains its battery power.

SUMMARY OF THE INVENTION

A method and apparatus for adjusting the frequency of testing for a wireless communications signal are described. The computer-implemented method comprises detecting a change in a wireless communications signal. The method further comprises receiving motion data and determining, based on the motion data whether and how to adjust the frequency of testing for the wireless communications signal.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described are for adjusting the frequency of testing for a wireless communications signal. Generally speaking, when a mobile device, such as a mobile phone or wireless device, fails to detect a network connection, it sends out frequent pings in order to attempt to find a connection. However, when the device is out of range for some time, the frequent attempts to acquire a network connection drain the batteries. Generally speaking, failure to connect to a network is the result of being out of range, i.e. in an area not covered by the wireless or mobile network. Therefore, repeatedly attempting to connect to the network when conditions have not changed is futile, and only drains the batteries. The method and apparatus described herein ensures that the batteries are not drained when the device is temporarily in a location with no wireless communications signal.

Figure 1A:
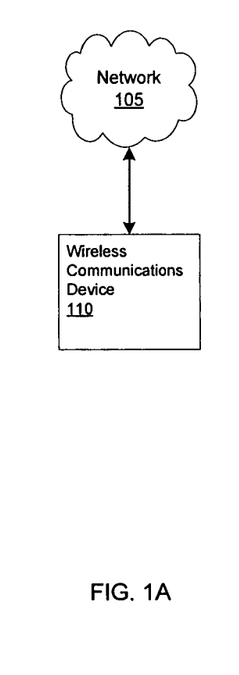
FIG. 1A is one embodiment of a network on which the present invention may be implemented.

FIG. 1A is one embodiment of a network on which the present invention may be implemented. The network 105 may be any type of wireless network. For example, the network 105 may be a wireless computer network, such as a wireless Local Area Network (LAN), Wireless Fidelity (IEEE 802.11X wireless networking), etc. In one embodiment, the network 105 may be a mobile communications network, such as a Global System for Mobile Communications network (GSM network), Code Division Multiple Access (CDMA), or other such network. Note that the wireless connection type is not relevant, as the present invention may work with any wireless connection/standard.

In one embodiment, the network 105 generally has a wireless communications device 110 connected to it. The wireless communications device 110 may be, for example, a mobile phone, PDA, portable computer, gaming device, or media player. In one embodiment, the wireless communications device 110 is a cell phone connected to a wireless network for mobile devices.

For simplicity, the below description uses a mobile phone and an associated mobile network. However, the techniques described herein are applicable to any device which automatically seeks to establish connection with a wireless network.

Figure 1B:
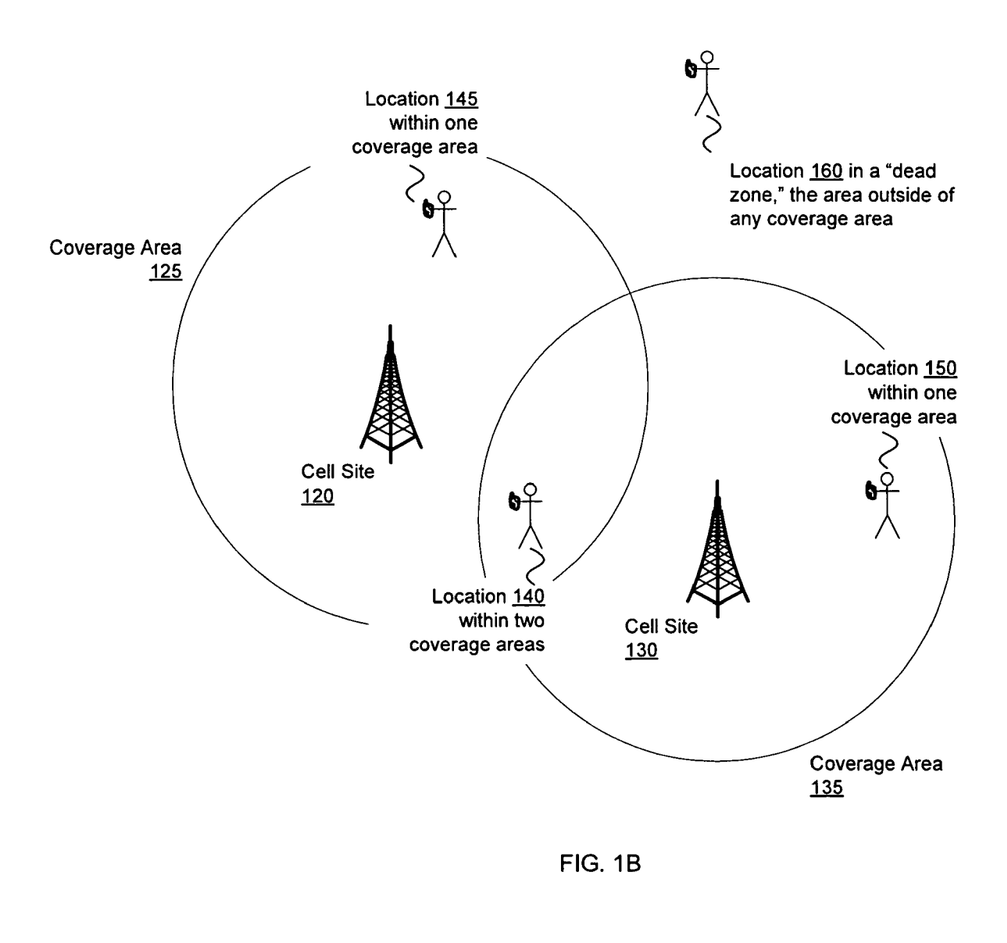
FIG. 1B is one embodiment of a network on which the present invention may be implemented.

FIG. 1B is one embodiment of a network on which the present invention may be implemented. In particular, FIG. 1B illustrates a wireless network that is a cellular network for mobile phones, also known as cellular phones, or cell phones. Cell phones establish phone service by connecting to a service provider's particular cellular network. A cellular network is collectively made up of "cells." Large geographic areas, such as cities, are divided into smaller cells. Each cell is defined by a cell tower, also known as a cell site. In addition, each cell site has its own transmitter to broadcast its presence and define a corresponding signal range, or "coverage area." Generally, each location is supported by one or more cell sites, which provide the cellular network coverage for the location.

The term coverage area as used in the present application is the area where a wireless communications device can connect to a wireless network. In one embodiment, a coverage area is the area where a cell phone can establish a connection with a cellular network. When a cell phone is first powered on, it "listens" for a System Identification Code (SID) on a control channel, a special frequency that the cell phone and cell site use to communicate with one another. If the cell phone cannot find any control channels to listen to, it knows it is out of range, that is, outside the coverage area, and in a "no service" area.

FIG. 1B illustrates two cell sites, cell site 120 and cell site 130, each of which having a corresponding coverage area, coverage area 125 and coverage area 135, respectively. In this embodiment, first location 145 is within coverage area 125 and thus, communicates with a cellular network via cell site 120. The second location 140 is within two overlapping coverage areas, coverage area 125 and coverage area 135. Third location 150 is in coverage area 135.

In one embodiment, when a cell phone has a connection to a cellular network, the cell phone has a cell phone signal, also known as reception. Reception is the strength of the connection between a wireless communications device and a network. In one embodiment, reception is the strength of the connection between a cell phone and the cellular network. In each coverage area, reception may be strong and the user can send and receive calls. However, the reception may vary due to a cell phone's proximity to a cell site or other factors, such as bandwidth availability or interference. As a user moves toward the edge of a cell site's coverage area, a cell phone's signal strength (reception) diminishes.

When a user is out of range of a cell site's coverage area, also known as a "dead zone," the user's cell phone cannot detect a signal. In FIG. 1B, for example, the area outside coverage area 125 and coverage area 135 is a dead zone. Fourth location 160 in FIG. 1B is in a dead zone. In this dead zone, cell phone reception may be weak or non-existent and consequently, no phone service is available at that location. As a result, the cell phone begins testing for an available cell phone signal, also known as "signal searching."

Similar to when a cell phone is first powered on and "listening" for an SID, in one embodiment, signal searching involves the cell phone actively and continually checking for a communications signal transmitted from a cell site. Note that the term signal searching as used in the present application is a wireless device actively searching for a wireless communications signal. In the prior art, the cell phone continued to search until it was within range of a cell site's coverage area, and in doing so the cell phone significantly drained its (battery) power.

Figure 2:
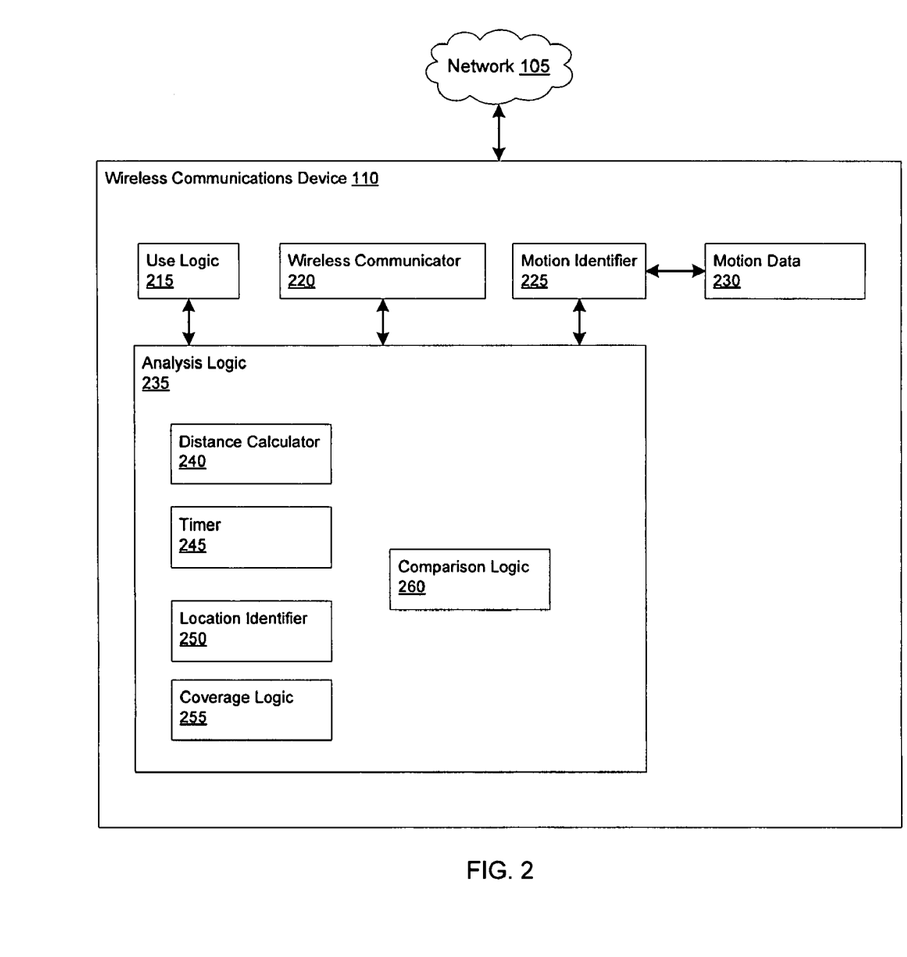
FIG. 2 is a block diagram of one embodiment of a wireless communications device.

FIG. 2 is a block diagram of one embodiment of a wireless communications device. In one embodiment, the wireless communications device 110 is a wireless cellular phone, or cell phone, connected to a wireless cellular network 105. Alternatively, it may be any mobile device which can search for and connect to a wireless network.

In one embodiment, the wireless communications device includes use logic 215 and analysis logic 235. The use logic 215 determines whether a user is using a wireless communications signal and passes that information to the analysis logic 235. The analysis logic 235 determines whether to adjust the device's frequency of testing for a wireless communications signal.

In one embodiment, the wireless communications device includes a wireless communicator 220. The wireless communicator 220 detects whether there is a change in a wireless communications signal, and passes that information to the analysis logic 235. The change in the wireless communications signal may be an absence of signal, an appearance of the signal, or a significant change in the strength of the signal.

In one embodiment, the device includes a motion identifier 225. The motion identifier 225 receives motion data 230 that indicates whether there was any motion from the device and what type of motion, if any. In one embodiment, the motion identifier 225 receives motion data 230 from an accelerometer (inertial sensor). In one embodiment, the motion identifier 225 receives processed data from the accelerometer, which indicates device motion, if any. For example, in one embodiment, the motion data may indicate that the device is idle, that is, there is no motion. The motion data may indicate that there is motion. In one embodiment, the motion identifier 225 may differentiate between various types of motion. For example, the motion detected may be that of a user walking with the device. Alternatively, the motion detected may be that of the device in a moving vehicle, for example a car, or train. The motion identifier 225 passes the motion data to the analysis logic 235.

In turn, the analysis logic 235 uses the information from the wireless communicator 220 and motion identifier 225 to analyze whether to adjust and how to adjust the device's frequency of testing for a wireless communications signal based on the motion identified, and any changes in the wireless communications signal. These changes may be based on one or more of: device motion, distance traveled, current device location, or time elapsed.

For example, one situation occurs when the analysis logic 235 receives data from the motion identifier 225 indicating that a cell phone is idle (not moving), and there is no wireless communications signal. The analysis logic 235 may throttle the cell phone's signal searching to a minimal rate of testing for a wireless communications signal. Generally speaking, when a cell phone is idle, it is unlikely that reception will be regained. Therefore, it is more effective to reduce the signal searching to a minimum in order to reduce battery drain. In one embodiment, when a cell phone is idle, the analysis logic 235 uses a timer 245 (discussed below) to determine when to test for a signal and whether to increase the signal searching for a wireless communications signal back to a more frequent rate.

In another example, the analysis logic 235 may receive data from the motion identifier 225 indicating that a cell phone is in a moving vehicle. The analysis logic 235, in one embodiment, may then gradually throttle the cell phone's signal searching down to a lower rate as the cell phone continues to be in a dead zone. The cell phone's signal searching is gradually decreased because, generally speaking, when a cell phone is in a moving vehicle and has weak or lost reception, it is unlikely the cell phone will immediately regain reception. Rather, it is more likely the cell phone will reacquire reception after a period of time. In one embodiment, when a cell phone is in a moving vehicle and has little or no reception, the analysis logic 235 uses a timer 245 (discussed below) to determine how often to search for a signal and the appropriate time to increase the rate of signal searching for a wireless communications signal. Note that the present invention may work regardless of the motion identified by motion identifier 225. In one embodiment, if analysis logic 235 can utilize distance calculator 240 to determine a distance traveled, it may rely on that data to adjust throttling. For example, if a device can receive data from a global positioning system (GPS), or other type of sensor (not shown), and the GPS is operational, analysis logic 235 may rely on the GPS data and utilize distance calculator 240 to determine, based on a distance traveled (discussed below), how often to search for a signal and when to increase the frequency of testing for the signal.

In one embodiment, the analysis logic 235 includes a timer 245 and comparison logic 260. The timer 245 monitors how much time has elapsed from when a device has last attempted to connect to network. In one embodiment, the comparison logic 260 compares the time elapsed to a preset value. The analysis logic 235, using the timer 245 and comparison logic 260, then determines whether it is time to attempt connecting to the network. In one embodiment, the timer is set to 2 minutes, and triggers testing for connection every two minutes. In one embodiment, the timer 245 is adjusted based on historical data. For example, the timer may initially test for a signal every minute. Then, after a certain time has elapsed (i.e., 10 minutes), the timer 245 may trigger testing less frequently (i.e., every 2 minutes). This cycle of extending the period between tests may be repeated multiple times. In one embodiment, the time is adjusted between 30 seconds and 30 minutes. In one embodiment, the timer 245 may be set based on the type of motion identified. For example, testing may be every 5 minutes for an idle device, every 2 minutes for a device being carried by a walking user, and every 30 seconds for a device in a moving vehicle. This is because the moving vehicle is likely to take the device to a location where signal is available significantly faster than a walking user.

Similarly, in one embodiment, the analysis logic 235, using the timer 245 and comparison logic 260, determines whether it is time to increase the rate of signal searching.

In another example, if the analysis logic 235 receives data from the motion identifier 225 indicating that a user is traveling by foot (i.e., walking or jogging), the analysis logic 235 may stop searching for a signal until a certain distance is traveled, time has elapsed, or location has been reached. In one embodiment, the analysis logic 235 includes distance calculator 240 to determine when to start searching for a signal and whether to increase the frequency of testing for the wireless communications signal. The distance calculator 240 calculates the distance the device has moved based on the data from motion identifier 225. For example, at one point a cell phone's current location may be outside a cell site's coverage area and thus, the cell phone receives no signal. However, if, for example, a user walks with the cell phone, the cell phone moves from its current location to a new location which may have signal coverage.

In one embodiment, the distance calculator 240 calculates the distance the cell phone has moved and passes the calculated distance to the comparison logic 260. In one embodiment, distance calculator 240 is external to the analysis logic 235. In one embodiment, distance calculator 240 is part of a step counter (pedometer), incorporated into the wireless device 110. In one embodiment, the step counter system (not shown) provides distance data directly to the analysis logic 235.

In one embodiment, the comparison logic 260 compares the calculated distance traveled to a preset value. In one embodiment, the preset value is adjusted based on historical data. The preset value, in one embodiment, is a certain distance. For example, the distance may be 50 feet. Thus, in this example, the cell phone will test for a signal when a distance of 50 feet has been traveled since the last time the signal was sought. In one embodiment, the preset value is an adjustable value. For example, the preset distance may initially be every 10 feet. Then, after a certain distance has been traveled (i.e., 30 feet), the preset value may be adjusted to trigger testing less frequently (i.e., every 50 feet). This cycle of extending the distance traveled between tests may be repeated multiple times. In one embodiment, the distance is adjusted between 2 feet and 200 feet. In one embodiment, the analysis logic 235, using distance calculator 240 and comparison logic 260, then determines whether to re-adjust the frequency of signal searching (i.e., increase the frequency of signal search to a normal rate).

In one embodiment, the analysis logic 235 includes a location identifier 250 and coverage logic 255. The location identifier 250 determines the current location of the device. In one embodiment, the location identifier 250 may triangulate the location of a cell phone based on data from two or more cell sites, to determine the cell phone's current physical location. Alternatively, the location identifier 250 may include GPS, or other methods of determining a current location. Alternatively, the location identifier 250 may determine the location of the device using the information received from the motion identifier 225.

In one embodiment, coverage logic 255 obtains a coverage map when the device detects that it is traveling towards the end of a coverage area. In one embodiment, as the user travels towards a dead zone, the coverage map is downloaded to the mobile device.

The location identifier 250 determines the device's current location. The location may be an absolute location or a relative location. The coverage logic 255 determines, using the location information from location identifier 250 and the coverage map, whether the device's location is nearing a coverage area. The analysis logic 235, using the coverage logic 255, determines whether to test for network access.

In one embodiment, one or more of the above analysis logic 235 components may be present in a system. The system utilizes the motion data to adjust, and throttle, the frequency of testing for a wireless communications signal. In one embodiment, the motion data is used to determine what circumstances the device is in—in one place (idle), moving with a user at a slow pace, or in a moving vehicle. Based on the device circumstances, the system determines how to adjust the frequency of testing for the wireless communications signal. In one embodiment, one system may rely only on time (i.e., testing every N minutes instead of every 0.5 seconds). In one embodiment, the system may rely on distance traveled data (i.e., testing every time the device has moved more than 10 feet). In one embodiment, the system may rely on comparison of a current location with a downloaded coverage map. In one embodiment, a combination of the above techniques may be used. For example, if no motion is detected within 5 minutes, the system may test, based on a timer.

Figure 3:
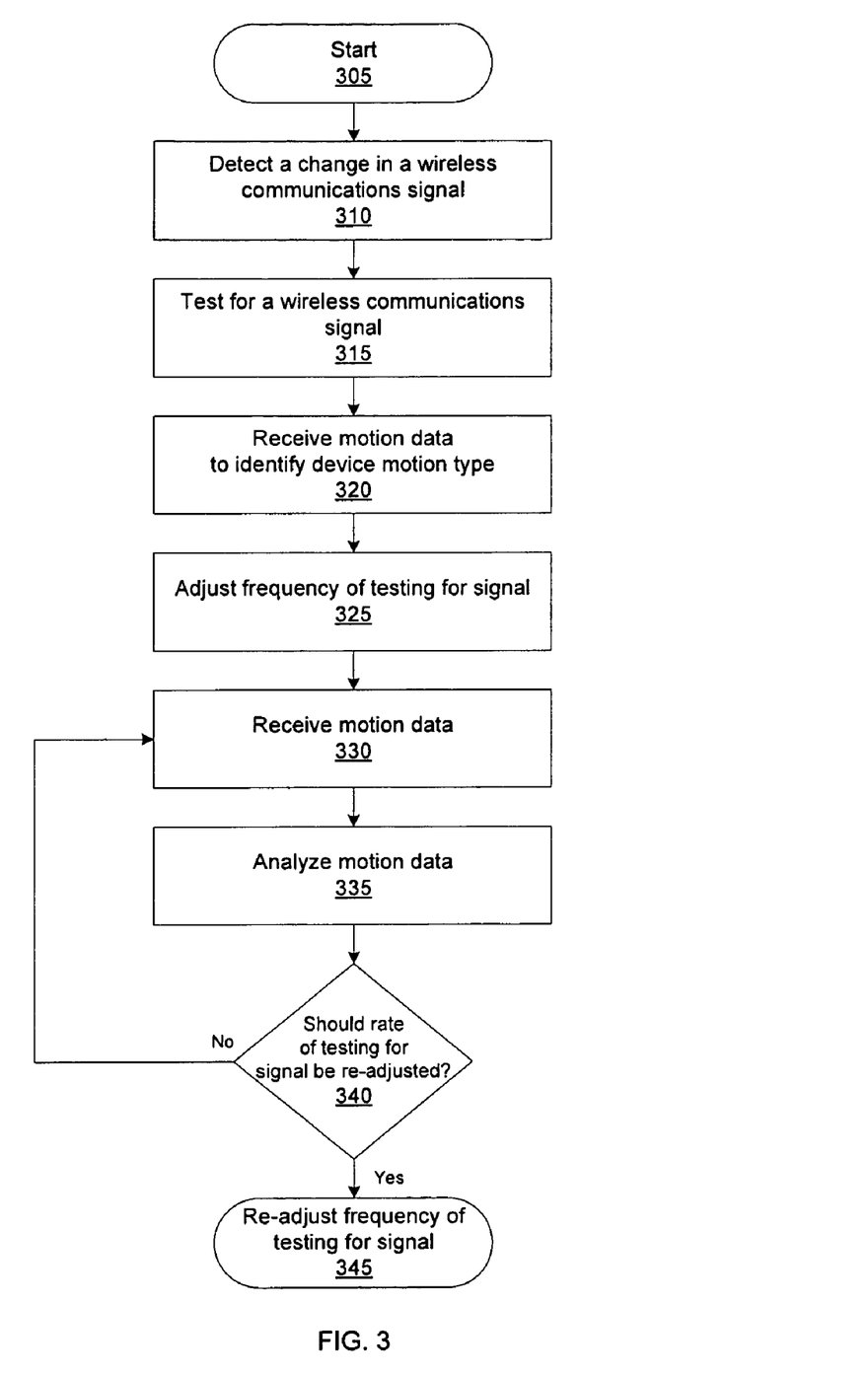
FIG. 3 is an overview flowchart of one embodiment of adjusting a frequency of testing for a wireless communications signal.

FIG. 3 is an overview flowchart of one embodiment of adjusting a frequency of testing for a wireless communications signal. The process starts at block 305. A change in a device's wireless communications signal is detected, at block 310. For example, the device can be a mobile cellular phone which enters a "no service" area.

At block 315, the device begins testing for a wireless communications signal. For example, a cell phone, which is out of range of a coverage area, will begin continuously testing for a signal and typically, there is a high frequency of testing.

At block 320, motion data is received and the type of motion is identified. In one embodiment, the motion data may be provided by an accelerometer or any other motion detection device. For example, the process may receive motion data and identify that a cell phone is idle, that is, there is no motion. Alternatively, the process may identify motion of a user walking with a cell phone. In another example, the process may identify motion of a cell phone in a moving vehicle.

At block 325, the frequency of testing for a wireless communications signal is adjusted based on the identified type of motion. For example, if a cell phone is idle, in one embodiment, the rate of searching for a signal may be reduced based on time, i.e., search every 2 minutes. In one embodiment, if a cell phone is in a moving vehicle, the cell phone may search for a signal search every minute or, in another embodiment, search for a signal based on distance if the device can access distance data from, for example, a GPS. In another example, if the identified motion is that of a user walking with a cell phone, in one embodiment, the cell phone stops signal searching until the user has walked 50 feet. One advantage of reducing the frequency of testing for a wireless communications signal is that a device consumes less power, and thus, the device's power is not rapidly depleted. Typically, if a user with a cell phone is in a "no service" area, the user is not actively using the cell phone. However, the continuous signal searching due to being in a "no service" area, consumes much of the cell phone's battery power.

At block 330, motion data is received. In one embodiment, the motion data may be provided by an accelerometer or any other motion detection device. In one embodiment, the motion data received at block 330 may be similar to the motion data received at block 320. For example, the cell phone may be idle at block 320 and the cell phone may still remain idle at block 330. On the other hand, the cell phone may be idle at block 320 and at block 330, a user may have started walking with the cell phone. Note that the present invention may work with any type or combination of motion data received.

At block 335, the motion data is analyzed and, at block 340, the process determines, based on the analysis, whether the rate of testing for the signal should be re-adjusted, i.e., whether the rate of testing should be further reduced, or increased to a higher frequency. In one embodiment, the process may further reduce the frequency of testing, if the motion data indicates no change.

If the process determines that the rate of testing should be re-adjusted, the frequency of the testing for the signal is re-adjusted at block 345. If the process determines that rate of the testing should not be re-adjusted, the process returns to block 330 to continue receiving motion data.

Figure 4:
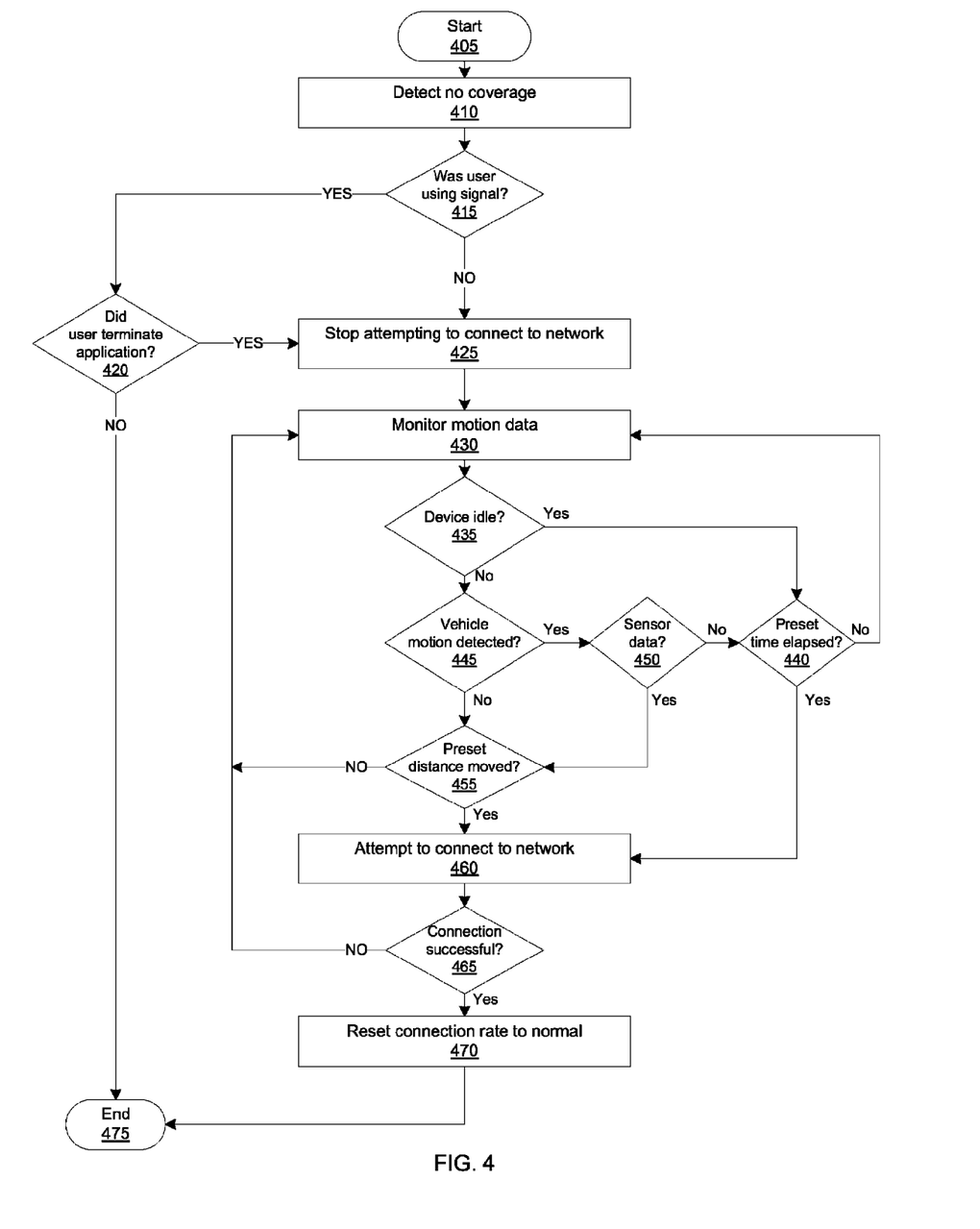
FIG. 4 is a flowchart of one embodiment of adjusting a frequency of testing for a wireless communications signal.

FIG. 4 is a flowchart of one embodiment of adjusting a frequency of testing for a wireless communications signal. The process starts at block 405.

At block 410, the process detects that a device is outside a coverage area. For example, this is detected when no SID is received on the control channel for a period of time.

At block 415, the process determines whether prior to the device being moved outside the coverage area, the device was in use. For example, a user may have a cell phone powered on, but a user may not be engaged in a phone call and therefore, not actively using a cell phone signal. If the signal is in use, the device assumes that the user wishes to continue use of the signal. Therefore, unless the system detects that the user terminates the application using the signal at block 420, the process ends and the frequency of testing for a wireless communications signal is not adjusted. That is, if the user is currently in need of the signal to continue an application that was running prior to the entry into the dead zone, the testing of the network signal continues at a high frequency. The process then ends at block 475.

If the signal was not in use, or the application was terminated—indicating that the user has no urgent need of signal access—the process continues to block 425.

At block 425, attempts to connect to the network are stopped. One advantage of stopping attempts to connect to the network is that fewer attempts consume less of the device's battery. In one embodiment, if the device is plugged in (i.e., being charged or using non-battery power), the process terminates.

At block 430, motion data is monitored. In one embodiment, the motion data is received from an accelerometer or any other motion detection device. As previously noted, generally, testing for a signal is ineffective if, for example, a cell phone has not moved from its position outside a coverage area. Ineffective signal searching is an inefficient use of a cell phone's battery power. As such, the process monitors motion data to help determine whether and how to adjust the frequency of testing.

At block 435, the process determines, from monitoring the motion data, whether the device is idle. If the device is idle, the process continues to block 440. At block 440, the process determines whether a preset time has elapsed. If a preset time has not elapsed, the process returns to monitoring the motion data at block 430. If a preset time has elapsed, the process continues to block 460. At block 460, the process resumes attempts to connect to network. In another embodiment, the process only tests for the network a few times, rather than resuming full-throttle testing. If the few tests do not result in a successful connection, the device remains in the low test rate state.

Returning to block 435, if the device is not idle, the process continues to block 445.

At block 445, the process determines, from monitoring the motion data, whether the device is in a moving vehicle. If the device is in a moving vehicle, the process continues to block 450, where the process determines whether the device includes or receives data from a sensor that provides distance information. In one embodiment, if the device includes or receives data from such a sensor, for example, a GPS device, the process continues to block 455 to determine if a preset distance has been moved. If the device does not include or receive data from such a sensor at block 450, the process continues to block 440. At block 440, the process determines whether a preset time has elapsed. At block 440, if a preset time has not elapsed, the process returns to monitoring the motion data at block 430. If a preset time has elapsed, the process continues to block 460. At block 460, the process resumes attempts to connect to network.

Returning to block 445, if no vehicle motion was detected, the process continues to block 455.

At block 455, the process determines, from monitoring the motion data, whether the device has moved a preset distance. In one embodiment, this test is only done when the distance can be calculated. The distance calculation may be based on step data, if the user is walking or running, or on location data, if the location data can be calculated. If the device has not moved a preset distance, the process returns to monitoring the motion data at block 430. If the device has moved a preset distance, the process continues to block 460, where the process attempts to connect to the network.

At block 465, the process determines whether the attempts to connect to the network were successful. If the connection attempts were not successful, the process returns to block 430 to continue monitoring the motion data. If the connection was successful, the process continues to block 470. At block 470, the connection rate is reset to normal.

In this way, the system reduces the frequency of testing for a wireless communications signal when the device is likely to be and remain outside the coverage area, and when the user is not in need of immediate signal availability. Note that while the process shown in FIG. 4 utilizes both distance traveled and timer data, the system may operate with only one of these systems.

Figure 5:
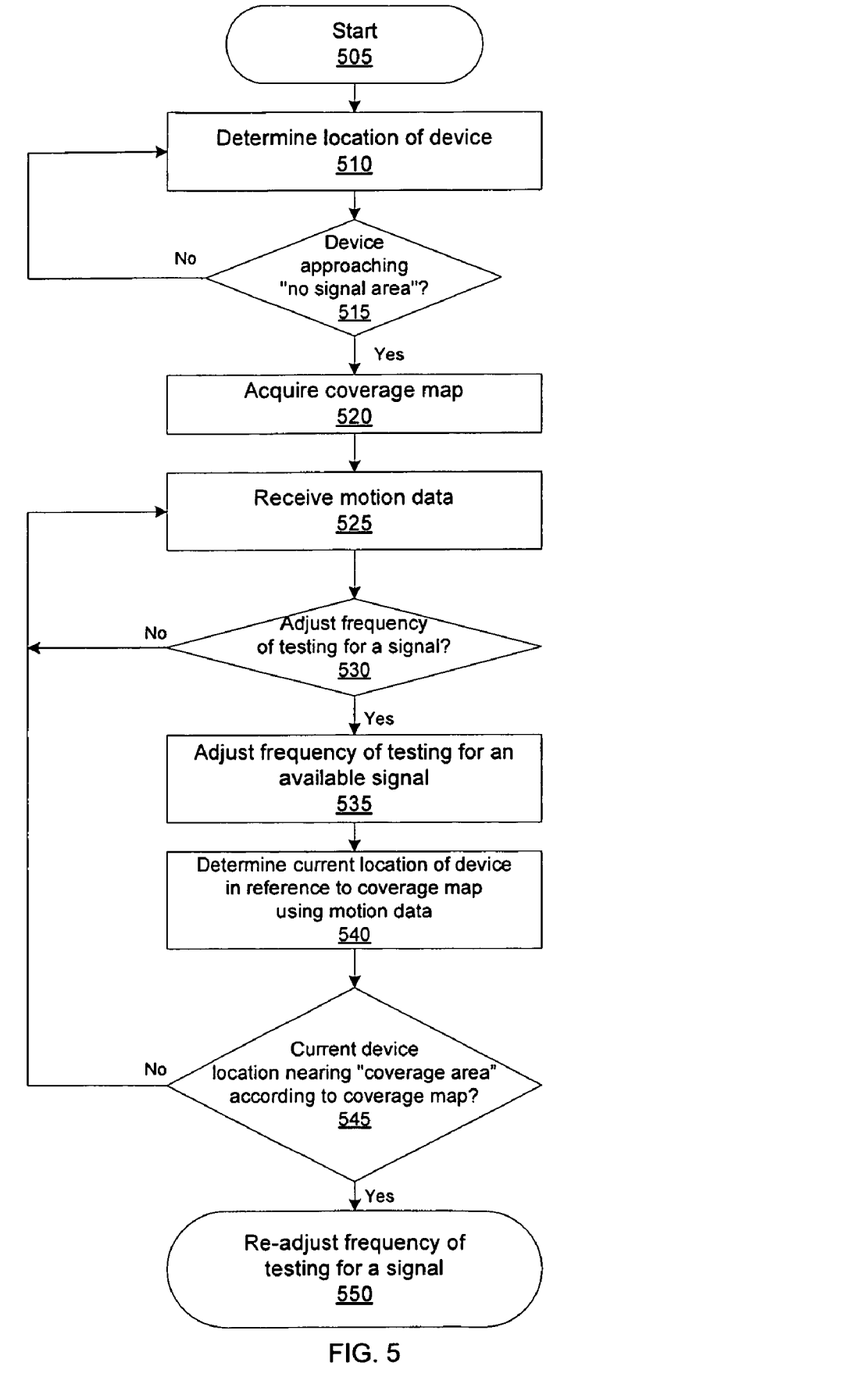
FIG. 5 is a flowchart of another embodiment of adjusting a frequency of testing for a wireless communications signal.

FIG. 5 is a flowchart of another embodiment adjusting a frequency of testing for a wireless communications signal using a coverage map. The process starts at block 505.

At block 510, the location of the device is determined. In one embodiment, the device location is triangulated. For example, the physical location of a cell phone can be triangulated by using three cell sites. A first cell site determines its distance to the cell phone, which could be located anywhere within the first cell site's coverage area. A second cell cite similarly determines its distance to the cell phone, narrowing the cell phone's location down. A third cell site determines its distance to the cell phone and using the information from the first and second cell sites, pinpoints the location of the cell phone. Alternative methods of acquiring the device's location may be utilized.

Using the device's location, the process determines whether the device is approaching a "no signal area," a dead zone, at block 515. If the device is not approaching a dead zone, the process returns to determining the location of the device, at block 510. If the process detects that the device is approaching a dead zone, the process continues to block 520.

At block 520, a coverage map is acquired. In one embodiment, the device requests the coverage map from a cell site. In one embodiment, the cellular provider may provide a copy of the coverage map automatically. Whether the data is pushed or pulled, in one embodiment, the coverage map is a local coverage map showing the dead zone and nearby coverage areas.

At block 525, the process receives motion data. In one embodiment the data is from an accelerometer. Using the accelerometer data, the process determines, at block 530, whether to adjust the frequency of testing for a wireless communications signal. If, at block 530, the process determines that the frequency of testing should not be adjusted, the process returns to block 525 to continue to receive motion data. If, at block 530, the process determines that the frequency of testing should be adjusted, then the process continues to block 535, where the frequency of testing is adjusted. In one embodiment, the frequency of testing for a wireless communications signal is reduced. The process then continues to block 540.

At block 540, the process determines the current location of device in reference to the acquired coverage map.

At block 545, the process determines, according to the acquired coverage map, whether the current location of the device is nearing a coverage area. In one embodiment, the device's current location is determined based on the last triangulation data which was available and the motion data indicating the device's motions since the data became unavailable.

If the device's current location is not approaching a coverage area, as indicated by the coverage map, the process returns to receiving motion data, at block 525. However, if the device's current location is nearing a coverage area, the process proceeds to block 550. At block 550, the frequency of testing for a wireless communications signal is re-adjusted. In one embodiment, the frequency of testing is increased.

In the foregoing specification, the invention has been described with reference to specific exemplary embodiments thereof. It will, however, be evident that various modification and changes may be made thereto without departing from the broader spirit and scope of the invention as set forth in the appended claims. The specification and drawings are, accordingly, to be regarded in an illustrative rather than a restrictive sense.

We claim:

1. A method, implemented by a computer program stored in a mobile device, comprising:
    detecting, by the mobile device, a change in a wireless communications signal, wherein the change includes absence of the wireless communications signal;
    receiving, by the mobile device, motion data from an accelerometer;
    determining, based on the accelerometer motion data and the change in the wireless communications signal, whether to continue searching for the wireless communications signal at a first rate;
    searching, by the mobile device, for the wireless communications signal at a reduced second rate based on a determination that there is an absence of signal and a lack of movement;
    monitoring a current location of the mobile device; and
    re-adjusting the searching to the first rate based on a determination that a coverage map indicates that the current location is a covered zone for the wireless communications signal.

2. The method of claim 1, wherein determining based on the motion data comprises:
    identifying an activity of the device based on the motion data; and
    selecting a corresponding second rate of searching for the wireless communications signal.

3. The method of claim 2, wherein the activity of the device includes one or more of:
    lack of motion indicating that the device is idle, motion indicating that the device is in a moving vehicle, motion indicating that the device is being carried on foot.

4. The method of claim 2, wherein the second rate includes a rate of searching for the wireless communications signal based on time.

5. The method of claim 2, wherein the second rate includes a rate of searching for the wireless communications signal based on distance moved by the mobile device.

6. A method, implemented by a computer program stored in a mobile device, comprising:
    testing, by the mobile device, for a wireless communications signal at a frequency of testing;
    detecting an absence of the wireless communications signal;
    receiving, by the mobile device, motion data from an accelerometer;
    determining, based on the accelerometer motion data and the wireless communications signal, an adjustment of the frequency of testing for the wireless communications signal;
    reducing, by the mobile device, the frequency of testing for the wireless communications signal based on the absence of signal and a lack of movement;
    identifying an activity of the device based on the motion data, the activity comprising one of: lack of movement, human carried, or vehicular travel;
    determining based on a threshold associated with the identified activity, whether to re-adjust the frequency of testing for the wireless communications signal; and
    re-adjusting, by the mobile device, the frequency of testing for the wireless communications signal when the associated threshold is met, wherein the threshold is based on the motion type determined by the motion identifier, the threshold being the following: for the stationary (idle) type a time elapsed, for the human carried type a distance traveled.

7. The method of claim 6, wherein the corresponding adjustment in frequency includes adjusting the frequency of testing for the wireless communications signal based on time.

8. The method of claim 6, wherein the corresponding adjustment in frequency includes adjusting the frequency of testing for the wireless communications signal based on distance.

9. The method of claim 6, wherein determining, based on the motion data whether to re-adjust the frequency of testing for the wireless communications signal comprises determining to re-adjust the frequency based on a determination that a distance threshold is met.

10. The method of claim 6, wherein determining, based on the motion data whether to re-adjust the frequency of testing for the wireless communications signal comprises determining to re-adjust the frequency based on a determination that a time elapsed threshold is met.

11. The method of claim 6, wherein determining, based on the motion data, whether to re-adjust the frequency of testing for the wireless communications signal comprises:
    comparing a current location calculated based on the motion data with a coverage map; and
    determining whether the coverage map indicates that the current location is in a covered zone for the wireless communications signal; and
    determining to re-adjust the frequency based on a determination that the current location is in a covered zone for the wireless communications signal.

12. A wireless communications device comprising:
a wireless communicator to detect a change in a wireless communications signal and to search for the wireless communications signal at a frequency;
a motion identifier to receive motion data from an accelerometer and to identify a motion type, the motion type selected from among stationary (idle), human carried, and vehicle carried, wherein the threshold is based on the motion type determined by the motion identifier, the threshold being the following: for the stationary (idle) type a time elapsed, for the human carried type a distance traveled; and
an analysis logic to determine, based on the motion type data from the motion identifier and the wireless communicator, whether to adjust the frequency of searching for the wireless communications signal, wherein to adjust the frequency comprises turning off the frequency of searching until a threshold is met when an absence of the wireless communications signal is detected.

13. The wireless communications device of claim 12, wherein the analysis logic comprises:
a distance calculator to determine, based on the motion data, that a distance threshold is met; and
the analysis logic to trigger the searching for the wireless communications signal, when the distance threshold is met.

14. The device of claim 12, wherein the analysis logic comprises:
a timer to determine, based on the motion data, that a time elapsed threshold is met; and
the analysis logic to trigger the searching for the wireless communications signal, when the time elapsed threshold is met.

15. The device of claim 12, wherein the analysis logic comprises:
a location identifier to determine a current location of the device;
a coverage logic to determine whether the coverage map indicates that the current location is in a covered zone for the wireless communications signal; and
the analysis logic to trigger the searching for the availability of the wireless communications signal, when the current location is in a covered zone for the wireless communications signal.

16. The device of claim 12, wherein the analysis logic comprises:
a comparison logic to compare a distance, based on the motion data, with a distance threshold, to compare a time, based on the motion data, with a time threshold, and to compare a current location, based on the motion data, with a coverage map.

17. The device of claim 12, further comprising:
a use logic to determine whether a device is using the wireless communications signal; and
when the device is using the wireless communications signal, adjusting the analysis logic to keep the searching for the signal at a normal rate.

18. A wireless device comprising:
a wireless communicator to determine that the wireless device is out of range of a wireless communications signal, wherein the device is out of range when the wireless communications signal cannot be detected; and
an analysis logic to reduce a rate of searching for the wireless communications signal when the wireless device is out of range of the wireless communications signal; and
the analysis logic to increase the rate of searching: a distance traveled threshold is met, a time elapsed threshold is met and a coverage map indicating indicates that a current location is a covered zone for the wireless communications signal.

19. The device of claim 18, further comprising:
a location identifier to determine a current location of the device;
a coverage logic to determine whether the coverage map indicates that the current location is in a covered zone for the wireless communications signal; and
the analysis logic to trigger the searching for the availability of the wireless communications signal, when the current location is in a covered zone for the wireless communications signal.

20. A cellular device comprising:
an accelerometer to measure motion data;
a motion identifier to identify a type of motion of the cellular device, based on the motion data, the type of motion identifying the cellular device as stationary, human carried, or vehicle carried;
an analysis logic to adjust downward a rate of searching for a cellular communications signal when the cellular device is out of range of the cellular communications signal, the adjusted rate of searching set based on the type of motion identified by the motion identifier, wherein the threshold is based on the motion type determined by the motion identifier, the threshold being the following: for the stationary (idle) type a time elapsed, for the human carried type a distance traveled.

21. The cellular device of claim 20, wherein to adjust the rate of searching for a cellular communications signal when the cellular device is out of range comprises the analysis logic to turn off the searching until a threshold is met.

22. The cellular device of claim 21, wherein a threshold is at least one of: a distance threshold and a time elapsed threshold.

* * * * *